3,387,955
ABRASIVE COATED PRODUCTS
Halsey W. Buell, Niagara Falls, and Robert E. Blair, Williamsville, N.Y., assignors to The Carborundum Company, Niagara Falls, N.Y., a corporation of Delaware
No Drawing. Filed July 12, 1965, Ser. No. 471,452
7 Claims. (Cl. 51—295)

ABSTRACT OF THE DISCLOSURE

An abrasive coated article comprising a flexible backing and abrasive granules secured to said backing by an adhesive. The adhesive comprises a maker coat and a grain size coat containing a thermoset resin and finely divided substantially water-insoluble organic fillers.

---

The invention of this application relates to abrasive coated products and particularly to such abrasive coated products as flexible abrasive belts and discs.

It is an object of the invention to provide products of the character described which have improved cutting rates on metal.

Another object of the invention is to provide products of the character described which show an improved abrasive efficiency.

A further object of the invention is to provide products of the character described which are less subject to loading.

Other objects and advantages will be apparent from the following description of the invention.

A widely used abrasive coated product is known as Resin Metal Cloth. This product in the form of discs or belts is used extensively in the finishing of die castings and comprises a flexible cloth backing having a coating of abrasive granules secured thereto by an adhesive. While the making coat, i.e. the adhesive applied to the backing prior to applying the granular abrasive, may be either glue or resin, the size coat, that is applied over the abrasive is a heat-hardenable resin such as a phenolic resin. Thus the surface of the abrasive products is resistant to the heat that results from the use of the products and the useful life of the products is prolonged.

It has been discovered that improved results can be obtained with abrasive coated products such as Resin Metal Cloth by incorporating in the size coat a filler consisting of finely divided, insoluble organic materials. The resultant products, in comparative grinding tests, exhibit a higher metal removal rate, less loading, and a lower loss of abrasive than products otherwise the same except for the omission of the organic filler. While the organic filler should be generally insoluble in the water-liquid resin mixture used as a size adhesive it is not necessary to exclude materials which have some degree of solubility so long as they occur in particulate form in the final product.

The following example sets forth, in sufficient detail to enable those skilled in the art to practice the invention, the procedure and materials employed in producing an improved abrasive product according to the invention.

Example I

A conventional machine was used for applying the adhesive coats and the abrasive coat to the backing. The latter was a conventionad jeans cloth, having a cloth count of 96 x 64, which had been dyed, prestretched, and filled with a mixture of starch and glue in conventional manner.

The making coat of adhesive consisted of

Hide glue _____ kg__ 45
Water _____ l__ ±60 the water content being adjusted to give a glue solution with a viscosity of 1000 cp. measured with a Brookfield Viscosimeter at 60° C. This solution was applied to the web of jeans cloth at the rate of 3.25 kg. per sandpaper ream, i.e. an area of approximately 30.65 sq. meters.

The abrasive granules, 150 grit fused alumina, were applied over the wet glue adhesive at the rate of 5.67 kg. per sandpaper ream and the web was air dried at room temperature for approximately 15 minutes before applying the size coat.

The adhesive for the size coat was an aqueous solution of a liquid, alkaline-catalyzed, phenol-formaldehyde condensation product. Such resins are well known and commercially available. One such suitable resin is Varcum 1023, produced by Varcum Chemical Division of Reichold Chemicals, Inc. The adhesive contains finely divided ethyl cellulose dispersed therein. The composition employed consisted of Liquid resin (70 percent solids) _____ kg__ 250
Ethyl cellulose (325 mesh and finer) _____ kg__ 5
Water _____ l__ ±53

The ethyl cellulose was dispersed in a small amount of the water and the dispersion was stirred into the liquid resin before additional water was added. The exact amount of water used is adjusted to provide the desired viscosity for coating. This adhesive was applied over the abrasive particles on the cloth web at the rate of 2.4 kg. per sandpaper ream.

The coated web was then dried at about 55° C. for 1.5 hours, rolled up and heat cured in roll form by heating at successively higher temperatures, up to about 90° C.–95° C., for a total of about 56 hours. The time required varies with the temperature used and the size of the rolls of abrasive coated web but such curing is well known in the industry and a proper curing time-temperature range can be readily determined by those skilled in the art.

After the abrasive coated product is cured it may be formed by conventional procedures into abrasive discs, abrasive belts, and other desired abrasive products.

It will be understood that the foregoing example is only illustrative and that many modifications of the procedure and variations in the materials employed may be used. It is essential, however, that the size coat comprise a heat-hardenable resin and a finely divided organic filler.

It has been found that cellulose ethers, vinyl polymers, and polyolefins are particularly useful as organic fillers in carrying out the present invention and a variety of such materials has been used with excellent results. The improvement was determined by subjecting abrasive coated belts to a standardized grinding test comparing the amounts of metal removed from a steel workpiece during a fixed period of time by belts formed from abrasive coated products produced in accordance with the invention and by belts formed from abrasive coated products which are otherwise substantially identical except that they do not contain an organic filler in the size coat of adhesive. The following table shows some of the improved results obtained, the belts without organic filler in the size coat being the standard products referred to.

TABLE I

| Organic Filler | Amount Percent [1] | Abrasive Grit Size | Increase in Metal Removed over Standard, Percent |
|---|---|---|---|
| Ethyl cellulose | 2.86 | 150 | 17.5 |
| Do | 2.86 | 150 | 21.7 |
| Do | 3.57 | 220 | 60.0 |
| Do | 3.57 | 150 | 20.0 |
| Hydroxyethyl cellulose | 3.57 | 220 | 20.0 |
| Do | 7.14 | 220 | 33.3 |
| Do | 7.14 | 150 | 18.1 |
| Polyethylene | 2.86 | 150 | 17.5 |
| Vinyl acetate-chloride copolymer | 2.86 | 150 | 12.5 |
| Polypropylene | 2.86 | 150 | 3.3 |

[1] Based on weight of resin solids.

In these tests the abrasive loss from the belts was generally too small to determine accurately but it has been found in extensive tests that the average abrasive loss is no greater than that of standard products and is frequently lower. It has also been found in actual use that there is usually significantly less loading of the abrasive surface with products according to the present invention than with products containing no organic filler in the size coat of adhesive.

Other organic materials in finely divided form may also be used as fillers in carrying out the present invention. Examples of these are polystyrene, cellulose esters, acrylic polymers, and elastomers, both natural and synthetic.

In general best results are obtained when the organic filler in the size adhesive is quite fine and fillers passing a 325 mesh sieve are usually employed. Somewhat larger particles, however, can be present in small amounts without deleterious effect but in no case should the organic filler comprise particles that are larger than the abrasive particles of the products. Since Resin Metal Cloth in abrasive grit sizes coarser than 150 grit is usually not as subject to loading as in the finer grit sizes and is consequently not particularly benefited by the present invention the organic filler may range in particle size from 150 mesh down. As stated above, however, the major portion of the filler should be much finer.

It has been determined that improved results are obtained when the adhesive size coat contains as little as 1 percent of organic filler based on the resin solids in the size coat. Up to about 10 percent filler may be employed but in general a filler content of about 2 percent to about 5 percent based on the resin solids is preferred.

Although in the foregoing example the adhesive making coat was composed of hide glue it will be understood that other suitable adhesives may be used. Such adhesives, in general, should have a hardness and flexibility of the same order as hide glue and, of course, should present no problem in adhesion with the backing, the abrasive, or the adhesive size coat. Among the other usable making coat adhesives are phenolic resins, epoxy resins, and ureaformaldehyde resins.

It will be apparent from the foregoing description that the invention set forth therein presents novel and useful features and results in improved abrasive coated products.

In this specification and the appended claims percentages specified are percentages by weight, and mesh sizes are based on the U.S. Standard Sieve Series.

We claim:
1. An abrasive coated product which comprises a flexible backing and abrasive granules secured to said backing by adhesive, said adhesive comprising a making coat and a grain sizing coat containing a heat-hardened resin which includes, in an amount ranging from about 1 percent to about 10 percent based on the resin, a finely divided substantially water-insoluble organic filler selected from the group consisting of cellulose ethers, polystyrene, acrylic polymers, vinyl acetate-chloride copolymers, and polyolefins.
2. An abrasive coated product as defined in claim 1 in which the heat-hardened resin is a phenol-formaldehyde resin.
3. An abrasive coated product as defined in claim 1 in which said filler is present in an amount ranging from about 2 percent to about 5 percent based on the resin.
4. An abrasive coated product as defined in claim 1 in which said making coat contains glue.
5. An abrasive coated product as defined in claim 1 in which said filler is ethyl cellulose.
6. An abrasive coated product as defined in claim 1 in which said filler is hydroxy-ethyl cellulose.
7. An abrasive coated product as defined in claim 1 in which said filler is polyethylene.

References Cited
UNITED STATES PATENTS

| | | | |
|---|---|---|---|
| 2,322,156 | 6/1943 | Oglesby | 51—298.1 |
| 2,340,504 | 2/1944 | Beatty | 51—295 |
| 2,592,954 | 4/1952 | Robie | 51—298 |
| 2,873,181 | 2/1959 | Hanford | 51—298 |
| 2,893,854 | 7/1959 | Rinker et al. | 51—303 |
| 3,042,508 | 7/1962 | Haigis et al. | 51—295 |
| 3,256,076 | 6/1966 | Duwell et al. | 51—295 |

DONALD J. ARNOLD, *Primary Examiner.*